US011820884B2

(12) United States Patent
Yoon et al.

(10) Patent No.: US 11,820,884 B2
(45) Date of Patent: Nov. 21, 2023

(54) THERMOPLASTIC RESIN COMPOSITION HAVING HIGH RIGIDITY AND LOW COEFFICIENT OF LINEAR THERMAL EXPANSION AND MOLDED ARTICLE COMPRISING SAME

(71) Applicants: Hyundai Motor Company, Seoul (KR); Kia Corporation, Seoul (KR); Dae Ha Co., Ltd., Dangjin-si (KR)

(72) Inventors: Jin Young Yoon, Gimpo-si (KR); Hee Joon Lee, Seoul (KR); Dong Eun Cha, Hwaseong-si (KR); Sun Jun Kwon, Seoul (KR); Chun Ho Park, Seoul (KR); Seung Ryong Jeong, Seoul (KR); Kwan Suk Ryu, Suwon-si (KR); Tae Kyung Lee, Incheon (KR)

(73) Assignees: HYUNDAI MOTOR COMPANY, Seoul (KR); KIA CORPORATION, Seoul (KR); DAE HA CO., LTD., Dangjin-si (KR)

( * ) Notice: Subject to any disclaimer, the term of this patent is extended or adjusted under 35 U.S.C. 154(b) by 11 days.

(21) Appl. No.: 17/810,989

(22) Filed: Jul. 6, 2022

(65) Prior Publication Data
US 2023/0016858 A1 Jan. 19, 2023

(30) Foreign Application Priority Data
Jul. 6, 2021 (KR) ........................ 10-2021-0088629

(51) Int. Cl.
*C08L 23/12* (2006.01)
*C08L 23/16* (2006.01)

(52) U.S. Cl.
CPC ............... *C08L 23/12* (2013.01); *C08L 23/16* (2013.01); *C08L 2205/025* (2013.01)

(58) Field of Classification Search
CPC .... C08L 23/142; C08L 23/12; C08L 23/0815; C08K 3/013; C08K 3/014; C08K 3/34
See application file for complete search history.

(56) References Cited

U.S. PATENT DOCUMENTS

| 5,829,804 A * | 11/1998 | Saeki ..................... B60R 19/03 524/505 |
| 5,854,328 A * | 12/1998 | Koizumi ................. C08L 23/10 524/451 |
| 2001/0006990 A1 * | 7/2001 | Jeong ...................... C08L 23/04 524/451 |
| 2010/0204381 A1 * | 8/2010 | Heck ................... C08L 23/0815 524/451 |
| 2015/0259589 A1 * | 9/2015 | Takagi ................. C09D 201/00 252/75 |
| 2018/0319966 A1 * | 11/2018 | Lu ............................. C08K 7/04 |

FOREIGN PATENT DOCUMENTS

| JP | 2008205266 A | 9/2008 |
| JP | 2009062526 A | 3/2009 |
| JP | 2011071580 A | 4/2011 |
| JP | 2012207062 A | 10/2012 |

* cited by examiner

*Primary Examiner* — Mark S Kaucher
(74) *Attorney, Agent, or Firm* — MCDONNELL BOEHNEN HULBERT & BERGHOFF LLP

(57) ABSTRACT

The present disclosure provides a thermoplastic resin composition having high rigidity and a low coefficient of linear thermal expansion and a molded article including the same. Specifically, the thermoplastic resin composition includes a first polypropylene resin having crystallinity of 50% to 80%, a second polypropylene resin having a coefficient of linear thermal expansion of 70 μm/m·° C. to 90 μm/m·° C., an elastomer, and an inorganic filler.

19 Claims, No Drawings

THERMOPLASTIC RESIN COMPOSITION HAVING HIGH RIGIDITY AND LOW COEFFICIENT OF LINEAR THERMAL EXPANSION AND MOLDED ARTICLE COMPRISING SAME

CROSS-REFERENCE TO RELATED APPLICATIONS

This application claims under 35 U.S.C. § 119(a) the benefit of priority from Korean Patent Application No. 10-2021-0088629, filed on Jul. 6, 2021, the entire contents of which are incorporated herein by reference.

TECHNICAL FIELD

The present disclosure relates to a thermoplastic resin composition having high rigidity and a low coefficient of linear thermal expansion and a molded article including the same.

BACKGROUND

With the trend of increasingly stringent international environmental regulations and fuel economy regulations and the rising price of energy resources, new technologies for the development of materials and parts for automobiles are urgently required from the viewpoints not only of simply improving fuel efficiency but also of increasing competitiveness according to environmental regulations.

A promising way to improve the fuel efficiency of automobiles is weight reduction technology. By reducing the weight thereof, engine efficiency may be improved, and the performance of automobiles may be maximized, whereby it can be expected that increased fuel efficiency will be shown.

The weight reduction of automobiles is broadly divided into weight reduction of materials achieved using hollow materials, weight reduction of materials achieved through foaming, and weight reduction of materials achieved through part thinning.

In general, the weight reduction of materials through thinning is achieved in a manner such that the thinning is carried out while maintaining the physical properties of parts using high-rigidity inorganic fillers such as long fibers, carbon fibers and the like. However, this method results in poor moldability, so the appearance of parts is not uniform during molding, and a problem of poor dimensional stability in the longitudinal and transverse directions may occur.

With the goal of solving this problem, composite polypropylene to which a high-fluidity resin and a high-rigidity inorganic filler are applied may be devised. However, if the injection flowability of the composite polypropylene is too high or too low, flow marks may be formed, and thin parts cannot be manufactured unless an appropriate inorganic filler is used. In particular, polypropylene as a base resin becomes crystallized during melting, molding, and cooling steps of injection molding, and dimensional stability is highly likely to be problematic due to the high shrinkage rate and the high coefficient of linear thermal expansion of polypropylene.

SUMMARY

Accordingly, an objective of the present disclosure is to provide an automobile exterior material having reduced weight through thin-part molding.

Another objective of the present disclosure is to provide a thermoplastic resin composition capable of producing a molded article having excellent mechanical properties such as rigidity and the like while simultaneously exhibiting good dimensional stability.

The objectives of the present disclosure are not limited to the foregoing, and will be able to be clearly understood through the following description and to be realized by the means described in the claims and combinations thereof.

An embodiment of the present disclosure provides a thermoplastic resin composition including a first polypropylene resin having crystallinity of 50% to 80%, a second polypropylene resin having a coefficient of linear thermal expansion of 70 μm/m·°C. to 90 μm/m·°C., an elastomer, and an inorganic filler.

The thermoplastic resin composition may have a flexural modulus (FM) of 2,500 MPa or more and a coefficient of linear thermal expansion (CLTE) of 60 μm/m·°C. or less.

The first polypropylene resin may have a melt index (230°C., 2.16 kgf) of 50 g/10 min to 150 g/10 min.

The first polypropylene resin may include at least one selected from the group consisting of homo-polypropylene, a propylene-ethylene copolymer, and combinations thereof.

The propylene-ethylene copolymer may include 5 wt % to 15 wt % of ethylene based on the total weight thereof.

The first polypropylene resin may have a flexural modulus of 1,700 MPa to 2,000 MPa.

The second polypropylene resin may be dispersed in a matrix formed of the first polypropylene resin.

The second polypropylene resin may have a melt index (230°C., 2.16 kgf) of 10 g/10 min to 60 g/10 min.

The intrinsic viscosity of ethylene contained in the second polypropylene resin may be 5 dL/g or less.

The second polypropylene resin may include a propylene-ethylene copolymer.

The propylene-ethylene copolymer may include 1 wt % to 50 wt % of ethylene and 50 wt % to 99 wt % of propylene based on the total weight thereof.

The elastomer may have a melt index (190°C., 2.16 kgf) of 1 g/10 min to 100 g/10 min.

The elastomer may include at least one selected from the group consisting of a C3-C12 α-olefin copolymer, a styrenic copolymer, and combinations thereof.

The inorganic filler may have an average particle diameter of 1 μm to 10 μm.

The inorganic filler may have an aspect ratio of 1:2 to 1:8.

The inorganic filler may include at least one selected from the group consisting of talc, silica, wollastonite, mica, calcium carbonate, barium sulfate, magnesium oxide, calcium silicate, and combinations thereof.

The thermoplastic resin composition may include 40 wt % to 50 wt % of the first polypropylene resin, 5 wt % to 10 wt % of the second polypropylene resin, 20 wt % to 28 wt % of the elastomer, and 23 wt % to 26 wt % of the inorganic filler.

The thermoplastic resin composition may further include at least one additive selected from the group consisting of an antioxidant, an ultraviolet absorber, a nucleating agent, a coupling agent, a dispersant, a light stabilizer, a processing lubricant, a slipping agent, an antistatic agent, an inorganic pigment, and combinations thereof.

Another embodiment of the present disclosure provides a molded article including the thermoplastic resin composition described above.

The molded article may be at least one automobile exterior material selected from the group consisting of a side sill molding, door molding, fender molding, quarter glass molding, roof rack, side outer garnish, roof molding garnish, back panel molding, tailgate garnish, and combinations thereof.

According to the present disclosure, it is possible to maximize the performance of automobiles by reducing the weight of an automobile exterior material.

In addition, according to the present disclosure, it is possible to obtain a thermoplastic resin composition capable of producing a molded article having excellent mechanical properties such as rigidity and the like while simultaneously exhibiting good dimensional stability.

The effects of the present disclosure are not limited to the foregoing, and should be understood to include all effects that may be reasonably anticipated from the following description.

DETAILED DESCRIPTION

The above and other objectives, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

Hereinafter, when specifying the physical properties such as flexural modulus, coefficient of linear thermal expansion and the like of the composition and each component thereof, these mean the physical properties that may be realized when a series of molded articles are manufactured using the composition and each component thereof.

A thermoplastic resin composition having high rigidity and a low coefficient of linear thermal expansion according to the present disclosure includes, as a base resin, a first polypropylene resin having high crystallinity and a second polypropylene resin having low shrinkage, and also includes an elastomer and an inorganic filler.

The first polypropylene resin serves as a kind of base resin that forms the shape of a molded article when the molded article is produced using the thermoplastic resin composition.

The first polypropylene resin may include at least one selected from the group consisting of homo-polypropylene, a propylene-ethylene copolymer, and combinations thereof. The propylene-ethylene copolymer may be an alternating copolymer, a block copolymer, or a random copolymer. The propylene-ethylene copolymer may include 5 wt % to 15 wt % of ethylene and 85 wt % to 95 wt % of propylene based on the total weight thereof.

When the amount of ethylene falls within the corresponding range above, the following physical properties may be obtained.

Specifically, the first polypropylene resin may be a high-crystalline resin having crystallinity of 50% to 80%. Also, the first polypropylene resin may have a flexural modulus of 1,700 MPa to 2,000 MPa. A general polypropylene resin is known to have crystallinity of about 40% to 60%, a flexural modulus of about 1,200 MPa to 1,500 MPa, and impact strength of about 70 J/m to 150 J/m. The first polypropylene resin is high-crystalline polypropylene (HCPP), and thus has impact strength equivalent to that of a general polypropylene resin, and has high flexural modulus and crystallinity, so it is suitable for use in exterior materials for automobiles requiring high rigidity and high impact resistance.

The first polypropylene resin may have a melt index (230° C., 2.16 kgf) of 50 g/10 min to 150 g/10 min. If the melt index thereof is less than 50 g/10 min, the moldability may be deteriorated, whereas if the melt index thereof exceeds 150 g/10 min, the mechanical properties such as impact strength, rigidity and the like of a molded article made of the thermoplastic resin composition may be deteriorated.

The thermoplastic resin composition may include 40 wt % to 50 wt % of the first polypropylene. If the amount of the first polypropylene is less than 40 wt %, the fluidity of the composition may be deteriorated, whereas if the amount thereof exceeds 50 wt %, the impact resistance or rigidity of a molded article made of the thermoplastic resin composition may be deteriorated.

The second polypropylene resin is dispersed in a matrix formed of the first polypropylene resin, having high crystallinity, to thus improve the impact resistance, dimensional stability and the like of a molded article made of the thermoplastic resin composition.

The second polypropylene resin may include a propylene-ethylene copolymer. Specifically, the propylene-ethylene copolymer may be an alternating copolymer, a block copolymer, or a random copolymer. Also, the propylene-ethylene copolymer may include 1 wt % to 50 wt % of ethylene and 50 wt % to 99 wt % of propylene based on the total weight thereof.

The second polypropylene resin may be characterized by low shrinkage and a coefficient of linear thermal expansion of 70 μm/m·° C. to 90 μm/m·° C. In general, the coefficient of linear thermal expansion of a polypropylene resin is known to be about 100 μm/m·° C. to 150 μm/m·° C. Since the second polypropylene resin has low shrinkage compared to a general polypropylene resin, the dimensional stability of a molded article made of the thermoplastic resin composition may be improved.

The second polypropylene resin may have a melt index (230° C., 2.16 kgf) of 10 g/10 min to 60 g/10 min. If the melt index thereof is less than 10 g/10 min, the moldability may not be good, whereas if the melt index thereof exceeds 60 g/10 min, the mechanical strength of a molded article made of the thermoplastic resin composition may be deteriorated.

The intrinsic viscosity of ethylene contained in the second polypropylene resin may be 5 dL/g or less. If the intrinsic viscosity thereof exceeds 5 dL/g, the coefficient of linear thermal expansion and impact strength of a molded article made of the thermoplastic resin composition may be deteriorated.

The thermoplastic resin composition may include 5 wt % to 10 wt % of the second polypropylene resin. If the amount of the second polypropylene resin is less than 5 wt %, the dimensional stability of the molded article may be deteriorated, whereas if the amount thereof exceeds 10 wt %, the rigidity of the molded article may be deteriorated.

The elastomer is used to improve the impact resistance of a molded article obtained using the thermoplastic resin composition.

The elastomer may include at least one selected from the group consisting of a C3-C12 α-olefin copolymer, a styrenic copolymer, and combinations thereof.

The use of the C3-C12 α-olefin copolymer is capable of increasing the room-temperature impact strength and shrinkage of the molded article, and the use of the styrenic copolymer is capable of preventing the mechanical properties of the molded article from deteriorating.

The C3-C12 α-olefin may include at least one selected from the group consisting of 1-propene, 1-butene, 1-pentene, 4-methyl-1-pentene, 1-hexene, 1-heptene, 1-octene, 1-decene, 1-undecene, 1-dodecene, and combinations thereof.

The styrenic copolymer may include at least one selected from the group consisting of a styrene-ethylene copolymer, a styrene-butylene copolymer, a styrene-ethylene-propylene copolymer, a styrene-isoprene-styrene copolymer, a styrene-butylene-styrene copolymer, a styrene-ethylene-butylene-styrene copolymer, a styrene-ethylene-propylene-styrene copolymer, a styrene-ethylene-ethylene-propylene-styrene copolymer, and combinations thereof.

The elastomer may have a melt index (190° C., 2.16 kgf) of 1 g/10 min to 100 g/10 min.

The thermoplastic resin composition may include 20 wt % to 28 wt % of the elastomer. If the amount of the elastomer is less than 20 wt %, the impact resistance of a molded article made of the thermoplastic resin composition may be lowered, whereas if the amount thereof exceeds 28 wt %, the rigidity and the like of the molded article may be deteriorated.

The inorganic filler is used to achieve weight reduction of the molded article and to impart excellent mechanical rigidity, impact resistance, and dimensional stability thereto.

In the present disclosure, an inorganic filler having a high aspect ratio, at which rigidity and dimensional stability are superior, is used. Specifically, the inorganic filler may have an aspect ratio of 1:2 to 1:8 and an average particle diameter of 1 μm to 10 μm. When the aspect ratio and average particle diameter of the inorganic filler fall within the corresponding ranges above, the rigidity, impact resistance, and dimensional stability of the molded article may be desirably increased in a balanced manner.

The inorganic filler may include at least one selected from the group consisting of talc, silica, wollastonite, mica, calcium carbonate, barium sulfate, magnesium oxide, calcium silicate, and combinations thereof.

The thermoplastic resin composition may include 23 wt % to 26 wt % of the inorganic filler. If the amount of the inorganic filler is less than 23 wt %, the rigidity and dimensional stability of a molded article made of the thermoplastic resin composition may be insufficient, whereas if the amount thereof exceeds 26 wt %, the specific gravity may increase, making it impossible to reduce the weight of a molded article, and the impact strength thereof may be deteriorated.

The thermoplastic resin composition may further include at least one additive selected from the group consisting of an antioxidant, an ultraviolet absorber, a nucleating agent, a coupling agent, a dispersant, a light stabilizer, a processing lubricant, a slipping agent, an antistatic agent, an inorganic pigment, and combinations thereof.

The amount of the additive is not particularly limited, and may be, for example, 2 wt % to 6 wt %.

The antioxidant may include at least one selected from the group consisting of a phenol-based antioxidant, a phosphite-based antioxidant, thiodipropionate, and combinations thereof.

The slipping agent is used to improve scratch resistance by imparting slipperiness to the surface of a molded article using the thermoplastic resin composition. The slipping agent may include at least one selected from the group consisting of a siloxane-based slipping agent, an amide-based slipping agent, and combinations thereof.

The antistatic agent is used to reduce the generation of static electricity due to friction and to ensure that the additive is uniformly dispersed. The antistatic agent may include at least one selected from the group consisting of a low-molecular-weight antistatic agent, a high-molecular-weight antistatic agent, a conductive polymer, and combinations thereof.

In addition, the present disclosure pertains to a molded article produced using the thermoplastic resin composition. The method of manufacturing the molded article is not particularly limited, and may include various methods, such as injection, extrusion, and the like.

The molded article may be at least one automobile exterior material selected from the group consisting of a side sill molding, door molding, fender molding, quarter glass molding, roof rack, side outer garnish, roof molding garnish, back panel molding, tailgate garnish, and combinations thereof.

Also, the molded article is thin and is thus advantageous in view of reducing the weight of exterior materials, and simultaneously exhibits excellent mechanical rigidity, impact resistance, and dimensional stability. For example, the molded article may exhibit excellent mechanical strength and impact resistance even at a thickness of less than about 2.5 mm, or of 2.0 mm to 2.2 mm.

A better understanding of the present disclosure may be obtained through the following examples. These examples are merely set forth to illustrate the present disclosure, and are not to be construed as limiting the present disclosure.

Examples 1 and 2 and Comparative Examples 1 to 6

Respective thermoplastic resin compositions were obtained by mixing components in the amounts shown in Table 1 below. Specifically, the individual components were kneaded using a Super mixer or a ribbon mixer. Pellets were manufactured through water cooling using a twin-screw extruder (manufacturer: SM, diameter: 45 mm) under conditions of a temperature of 180° C. to 220° C., an extruder screw speed of 240 rpm, and a hopper feed speed of 700 rpm. The pellets were molded into samples having a predetermined shape using an injection-molding machine (manufacturer: Nikita, clamping force: 180 tons) set at 220° C.

TABLE 1

| Classification | Component [wt %] | | | | | | |
|---|---|---|---|---|---|---|---|
| | First PP resin | Second PP resin | Elastomer | Inorganic filler | Additive | Existing material 1 | Existing material 2 |
| Example 1 | 41 | 6 | 25 | 26 | 2 | — | — |
| Example 2 | 42 | 8 | 23 | 25 | 2 | — | — |
| Comparative Example 1 | — | — | — | — | — | 100 | — |
| Comparative Example 2 | — | — | — | — | — | — | 100 |
| Comparative Example 3 | 49 | — | 25 | 24 | 2 | — | — |
| Comparative Example 4 | 42 | 5 | 30 | 21 | 2 | — | — |
| Comparative Example 5 | 35 | 10 | 28 | 25 | 2 | — | — |
| Comparative Example 6 | 41 | 6 | 23 | 28 | 2 | — | — |

Each component in Table 1 was as follows.

First polypropylene resin: A mixture of homo-polypropylene having crystallinity of 60% or more, a melt index of 120-130 g/10 min, and a flexural modulus of 2,000 MPa or more and homo-polypropylene having crystallinity of 60% or more, a melt index of 50-70 g/10 min, and a flexural modulus of 2,200 MPa or more.

Second polypropylene resin: A propylene-ethylene copolymer having a coefficient of linear thermal expansion of 70-80 μm/m° C., a melt index of 15-30 g/10 min, an intrinsic viscosity of ethylene contained therein of 5 dL/g or less, and an ethylene content of 20-40 wt %

Elastomer: Any one selected from the group consisting of a C3-C12 α-olefin copolymer, a styrenic copolymer, and combinations thereof and having a melt index of 0.5-5 g/10 min.

Inorganic filler: High-aspect-ratio (HAR) talc having an average particle diameter of 2 to 10 μm and an aspect ratio of 1:2 to 1:8

Additive: Antioxidant

Existing material 1: A thermoplastic resin composition including 63 wt % of high-crystalline polypropylene, 18 wt % of an ethylene-octene rubber elastomer, 16 wt % of HAR talc, 1 wt % of an interface coupling agent, and the balance of an additive, the additive including at least one selected from the group consisting of an antioxidant, an ultraviolet absorber, a nucleating agent, a coupling agent, a dispersant, a light stabilizer, a processing lubricant, a slipping agent, an antistatic agent, an inorganic pigment, and combinations thereof Existing material 2: A thermoplastic resin composition including 49 wt % of high-crystalline polypropylene, 23 wt % of an ethylene-octene rubber elastomer, 25 wt % of talc, and the balance of an additive, the additive including at least one selected from the group consisting of an antioxidant, an ultraviolet absorber, a nucleating agent, a coupling agent, a dispersant, a light stabilizer, a processing lubricant, a slipping agent, an antistatic agent, an inorganic pigment, and combinations thereof

TEST EXAMPLE

The physical properties of the molded articles according to Examples and Comparative Examples were measured using the following methods and conditions.

(a) Specific gravity (g/μl): Measurement was made according to ASTM D 792. (b) Melt index (MI, g/10 min): Measurement was made according to ASTM D 1238 (230° C., 2.16 Kg).

(c) Tensile strength (MPa): Measurement was made according to ASTM D 638 (sample thickness: 3.2 mm, 23° C.).

(d) Flexural modulus (MPa): Measurement was made according to ASTM D 790 (sample thickness: 6.4 mm, 23° C.).

(e) Impact strength (Notched IZOD, J/m): Measurement was made according to ASTM D 256 (sample thickness: 6.4 mm, 23° C.).

(f) Heat deflection temperature (HDT, ° C.): Measurement was made according to ASTM D 648 (4.6 kg load, sample thickness: 6.4 mm).

(g) Coefficient of linear thermal expansion (CLTE, μm/m·° C.): Measurement was made according to ASTM D696-79 (−30° C. to 60° C., sample: 10×12.7×3.2 mm).

The results thereof are shown in Table 2 below.

TABLE 2

| Classification | Specific gravity | Melt index | Tensile strength | Flexural modulus | IZOD impact strength | HDT | CLTE | Moldability | Evaluation |
|---|---|---|---|---|---|---|---|---|---|
| Example 1 | 1.07 | 38 | 19 | 2,560 | 372 | 110 | 56.7 | Good | Pass |
| Example 2 | 1.06 | 40 | 20 | 2,630 | 353 | 108 | 58.3 | Good | Pass |
| Comparative Example 1 | 1.00 | 43 | 24 | 2,450 | 392 | 122 | 63.0 | Shrinkage/CLTE deterioration | Fail |
| Comparative Example 2 | 1.06 | 20 | 17 | 1,770 | 362 | 104 | 66.8 | Shrinkage/CLTE deterioration | Fail |
| Comparative Example 3 | 1.05 | 44 | 20 | 2,570 | 349 | 105 | 61.2 | Shrinkage/CLTE deterioration | Fail |
| Comparative Example 4 | 1.03 | 29 | 16 | 1,940 | 568 | 98 | 58.2 | Flow mark | Fail |
| Comparative Example 5 | 1.06 | 31 | 17 | 2,250 | 468 | 100 | 47.1 | Good | Fail |
| Comparative Example 6 | 1.11 | 38 | 22 | 2,810 | 333 | 108 | 52.4 | Good | Fail |

As is apparent from Table 2, Comparative Examples 1 and 2 using the existing materials were evaluated as "Fail" because the flexural modulus, coefficient of linear thermal expansion, and moldability were all poor.

Comparative Example 3 was a molded article made of the thermoplastic resin composition not including the second polypropylene having low shrinkage, and exhibited poor impact strength and moldability.

Comparative Example 4 was a molded article made of the thermoplastic resin composition including the elastomer in a large amount and the inorganic filler in a small amount, and exhibited poor flexural modulus, thermal deformation temperature, coefficient of linear thermal expansion, and moldability.

Comparative Example 5 was a molded article made of the thermoplastic resin composition including the first polypropylene having high crystallinity in a small amount, and exhibited poor melt index, flexural modulus, and coefficient of linear thermal expansion.

Comparative Example 6 was a molded article made of the thermoplastic resin composition including the inorganic filler in a large amount, and exhibited high specific gravity and poor impact strength.

The thermoplastic resin composition according to the present disclosure had a melt index (230° C., 2.16 kgf) of 35 g/10 min or more, and a molded article obtained using the same exhibited specific gravity of 1.10 g/cm$^3$ or less, tensile strength of 17 MPa or more, a heat deflection temperature of 108° C. or higher, a flexural modulus of 2,500 MPa or more, and a coefficient of linear thermal expansion of 60 μm/m·° C. or less. Therefore, the present disclosure provides a thermoplastic resin composition that exhibits good moldability due to the high melt index thereof, contributes to weight reduction due to the low specific gravity thereof, and is excellent both in mechanical properties, such as tensile strength, flexural modulus and the like, and in dimensional stability, such as coefficient of linear thermal expansion and the like, even when applied to a thin molded article.

Although specific embodiments of the present disclosure have been described with reference to the accompanying drawings, those skilled in the art will appreciate that the present disclosure may be embodied in other specific forms without changing the technical spirit or essential features thereof. Thus, the embodiments described above should be understood to be non-limiting and illustrative in every way.

What is claimed is:

1. A thermoplastic resin composition having a low coefficient of linear thermal expansion, comprising:
   a first polypropylene resin having crystallinity of 50% to 80%;
   a second polypropylene resin having a coefficient of linear thermal expansion of 70 μm/m·° C. to 90 μm/m·° C.;
   an elastomer; and
   an inorganic filler, wherein the thermoplastic resin composition has a flexural modulus (FM) of 2,500 MPa or more and a coefficient of linear thermal expansion (CLTE) of 60 μm/m·° C. or less,
   wherein the flexural modulus measurement is made according to ASTM D 790 (sample thickness: 6.4 mm, 23° C., and
   wherein the coefficient of linear thermal expansion measurement is made according to ASTM D696-79 (−30° C. to 60° C., sample: 10×12.7×3.2 mm).

2. The thermoplastic resin composition of claim 1, wherein the first polypropylene resin has a melt index (230° C., 2.16 kgf) of 50 g/10 min to 150 g/10 min.

3. The thermoplastic resin composition of claim 1, wherein the first polypropylene resin comprises at least one selected from the group consisting of homo-polypropylene, a propylene-ethylene copolymer, and combinations thereof.

4. The thermoplastic resin composition of claim 3, wherein the propylene-ethylene copolymer comprises 5 wt % to 15 wt % of ethylene based on a total weight thereof.

5. The thermoplastic resin composition of claim 1, wherein the first polypropylene resin has a flexural modulus of 1,700 MPa to 2,000 MPa.

6. The thermoplastic resin composition of claim 1, wherein the second polypropylene resin is dispersed in a matrix formed of the first polypropylene resin.

7. The thermoplastic resin composition of claim 1, wherein the second polypropylene resin has a melt index (230° C., 2.16 kgf) of 10 g/10 min to 60 g/10 min.

8. The thermoplastic resin composition of claim 1, wherein an intrinsic viscosity of ethylene contained in the second polypropylene resin is 5 dL/g or less.

9. The thermoplastic resin composition of claim 1, wherein the second polypropylene resin comprises a propylene-ethylene copolymer.

10. The thermoplastic resin composition of claim 9, wherein the propylene-ethylene copolymer comprises 1 wt % to 50 wt % of ethylene and 50 wt % to 99 wt % of propylene based on a total weight thereof.

11. The thermoplastic resin composition of claim 1, wherein the elastomer has a melt index (190° C., 2.16 kgf) of 1 g/10 min to 100 g/10 min.

12. The thermoplastic resin composition of claim 1, wherein the elastomer comprises at least one selected from the group consisting of a C3-C12 α-olefin copolymer, a styrenic copolymer, and combinations thereof.

13. The thermoplastic resin composition of claim 1, wherein the inorganic filler has an average particle diameter of 1 μm to 10 μm.

14. The thermoplastic resin composition of claim 1, wherein the inorganic filler has an aspect ratio of 1:2 to 1:8.

15. The thermoplastic resin composition of claim 1, wherein the inorganic filler comprises at least one selected from the group consisting of talc, silica, wollastonite, mica, calcium carbonate, barium sulfate, magnesium oxide, calcium silicate, and combinations thereof.

16. The thermoplastic resin composition of claim 1, comprising:
40 wt % to 50 wt % of the first polypropylene resin;
5 wt % to 10 wt % of the second polypropylene resin;
20 wt % to 28 wt % of the elastomer; and
23 wt % to 26 wt % of the inorganic filler.

17. The thermoplastic resin composition of claim 1, further comprising at least one additive selected from the group consisting of an antioxidant, an ultraviolet absorber, a nucleating agent, a coupling agent, a dispersant, a light stabilizer, a processing lubricant, a slipping agent, an anti-static agent, an inorganic pigment, and combinations thereof.

18. A molded article comprising the thermoplastic resin composition of claim 1.

19. The molded article of claim 18, wherein the molded article is at least one automobile exterior material selected from the group consisting of a side sill molding, door molding, fender molding, quarter glass molding, roof rack, side outer garnish, roof molding garnish, back panel molding, tailgate garnish, and combinations thereof.

* * * * *